United States Patent
Yamamoto

(10) Patent No.: US 9,001,084 B2
(45) Date of Patent: Apr. 7, 2015

(54) POSITION DETECTING DEVICE AND DISPLAY DEVICE

(75) Inventor: Sadao Yamamoto, Koshigaya (JP)

(73) Assignee: Wacom Co., Ltd., Tokyo (JP)

( * ) Notice: Subject to any disclaimer, the term of this patent is extended or adjusted under 35 U.S.C. 154(b) by 2112 days.

(21) Appl. No.: 11/960,907

(22) Filed: Dec. 20, 2007

(65) Prior Publication Data

US 2008/0150914 A1 Jun. 26, 2008

(30) Foreign Application Priority Data

Dec. 25, 2006 (JP) ................................ P2006-348362

(51) Int. Cl.
G06F 3/042 (2006.01)
G06F 3/046 (2006.01)
G06F 3/041 (2006.01)

(52) U.S. Cl.
CPC ................ *G06F 3/046* (2013.01); *G06F 3/041* (2013.01)

(58) Field of Classification Search
CPC .................................. G06F 3/046; G06F 3/041
USPC .................................... 345/98, 158, 173–181
See application file for complete search history.

(56) References Cited

U.S. PATENT DOCUMENTS

| | | | | |
|---|---|---|---|---|
| 5,220,324 A * | 6/1993 | Morita | ............................ | 341/32 |
| 5,381,160 A * | 1/1995 | Landmeier | .................... | 345/174 |
| 5,768,616 A * | 6/1998 | Teterwak | .......................... | 710/5 |
| 6,246,393 B1 * | 6/2001 | Watanabe et al. | ............. | 345/173 |
| 2004/0095333 A1* | 5/2004 | Morag et al. | ................... | 345/173 |
| 2004/0104899 A1* | 6/2004 | Hong et al. | .................... | 345/173 |
| 2005/0104865 A1* | 5/2005 | Oda et al. | ...................... | 345/173 |
| 2007/0085836 A1* | 4/2007 | Ely | ............................... | 345/173 |
| 2007/0285389 A1* | 12/2007 | Ito | ................................. | 345/158 |
| 2008/0303774 A1* | 12/2008 | Yoshinaga et al. | .............. | 345/98 |

FOREIGN PATENT DOCUMENTS

JP 63-115220 5/1988

* cited by examiner

*Primary Examiner* — Premal Patel
(74) *Attorney, Agent, or Firm* — Berenato & White, LLC

(57) ABSTRACT

A position detecting device usable with a display having a display-surface side and a rear-surface side opposite to the front side is provided. The position detecting device includes a position indicator, a detector, and a driving coil. The detector is provided on the display-surface side of the display and is configured to detect signals transmitted from the position indicator. The driving coil is provided on the rear-surface side of the display and is configured to supply electric current to the position indicator.

12 Claims, 4 Drawing Sheets

POSITION DETECTING DEVICE AND DISPLAY DEVICE

CROSS-REFERENCES TO RELATED APPLICATIONS AND CLAIM TO PRIORITY

The present invention claims priority from Japanese Patent Application JP 2006-348362, filed in the Japanese Patent Office on Dec. 25, 2006, the contents of which are incorporated herein by reference and to which priority is claimed.

FIELD OF THE INVENTION

The present invention relates to a position detecting device and a display device suitable for use as a display/input device to input a position to a display surface. More specifically, when the position detecting device is disposed on a display-surface side of the display device, the present invention provides a sufficient supply of electric current to a position indicator and provides stable and satisfactory position detection of the position indicator constantly.

BACKGROUND OF THE INVENTION

Display devices having a planar display surface such as liquid crystal displays have been combined with position detecting devices. The position detecting device is disposed on the display surface of the display device so that an image output by the display device and a position input can easily be associated (see, for example, Japanese Patent No. 2139446).

The position detecting device used for the position input is typically an electromagnetic induction-type position detecting device. The electromagnetic induction-type position detecting device is able to detect the position of the position indicator even when the position indicator is a distance away from the surface or not in contact with the surface. Hence, there are also display/input devices having the electromagnetic induction-type position detecting device disposed at the rear-surface side of the display device (see, for example, U.S. Pat. No. 4,988,837).

When a position indicator is used to input a position, detection coils may be provided as close to the position indicator as possible so that detection can be performed with high accuracy. To this end, detection coils have been positioned on the display surface side of the display device using ITO (indium tin oxide), or other transparent members. Additionally, when employing an electromagnetic induction-type position detecting device, a single coil has also been used to perform both detection of signals using the position indicator, and supply electric current to the position indicator.

SUMMARY OF THE INVENTION

When detecting the signals transmitted from the position indicator using the coil as described above, the voltage between both ends of the coil is detected so that a resistance value of the coil need not be considered. However, when supplying an electric current to the position indicator using the coil, an alternating current flows in the coil, and therefore a high resistance value may be a problem. Hence, when using a transparent member, such as the above-described ITO as the coil, the resistance value may not be made small. Thus, there is a possibility that a sufficient electric current may not be supplied.

On the other hand, a coil made of copper wire or other material with low resistance may be provided separately at a peripheral portion of a display so as not to interfere with the display, and an electric current is supplied from the coil disposed in the peripheral portion. However, in this case, when the position detecting device is used with a display device having a large display area, insufficient current is supplied to the position indicator when the position indicator is disposed at the center portion of the display. Consequently, the user may be required to periodically move the position indicator to the peripheral portion, and the position indicator may stop operating properly during use if the user fails to move the position indicator toward the peripheral portion.

The present invention provides constant stable position detection with sufficient electric current supplied to a position indicator when a detector is formed of a transparent member on the display-surface side of a display.

The present invention provides a position detecting device usable with a display having a front side and a rear side opposite to the front side. The position detecting device includes a position indicator for transmitting signals and a detector provided on the front side of the display and configured to detect the signals transmitted from the position indicator. A driving coil provided on the rear side of the display is configured to supply electric current to the position indicator.

The detector may be include electromagnetic induction-type detection coils formed of a transparent conductive member.

The position detecting device may further include a backlight module provided on the rear side of the display between the driving coil and the display.

The position detecting device may further include an auxiliary position detector employing a detection method other than electromagnetic induction provided with the electromagnetic induction-type detection coil.

The present invention also provides a display including the position detecting device described above.

The driving coil, which supplies an electric current to the position indicator, is provided on the rear-surface side of the display. Therefore, the driving coil can be formed of any material, including, for example, copper or other conductors. Further, the driving coil can be arranged in any position on the rear-surface side of the display. Hence, the material and position of the driving coil can be determined such that sufficient electric current can be supplied to the position indicator. Consequently, stable position detection can be performed constantly, regardless of where the position indicator is located with reference to the display. The driving coil may be intermittently driven so that a first signal transmitted by the driving coil and a second signal transmitted by a resonant circuit of the position detector are transmitted at different times. The driving coil may be driven constantly so that a first signal transmitted by the driving coil and a second signal transmitted by a resonant circuit of the position detector are transmitted simultaneously. The current position of the position indicator may be detected by comparing the signal strengths of the detecting coils.

The present invention also provides a position input display device including a display panel for displaying images. The display panel has a display side and a rear side opposite to the display side. A position detector is disposed on the display side of the display panel. The position detector includes a plurality of first conductive elements extending across the display side of the display panel. A position indicator transmits position indicating signals to the first conductive elements of the position detector. A driving coil transmits a position indicator driving signal to the position indicator to drive the position indicator. The driving coil includes at least one second conductive element disposed on the rear side of the display panel. The second conductive element has a lower resistance than said first conductive elements.

A method of detecting a position input using a position detecting device in combination with a display panel is also provided. The position detecting device includes a position detector disposed on a front side of the display panel and a driving coil disposed on a rear side of the display panel. The method includes transmitting a first signal from the rear side of the display panel using the driving coil to a position indicator having a resonant circuit disposed therein for inducing a current in the resonant circuit. In response to the transmission of the first signal, a second signal is received from the resonant circuit at the front side of the display panel using the position detector. A current position of the position indicator with respect to the front side of the display panel is determined based on the second signal received by the position detector.

DESCRIPTION OF THE PREFERRED EMBODIMENT(S)

Figure 1:
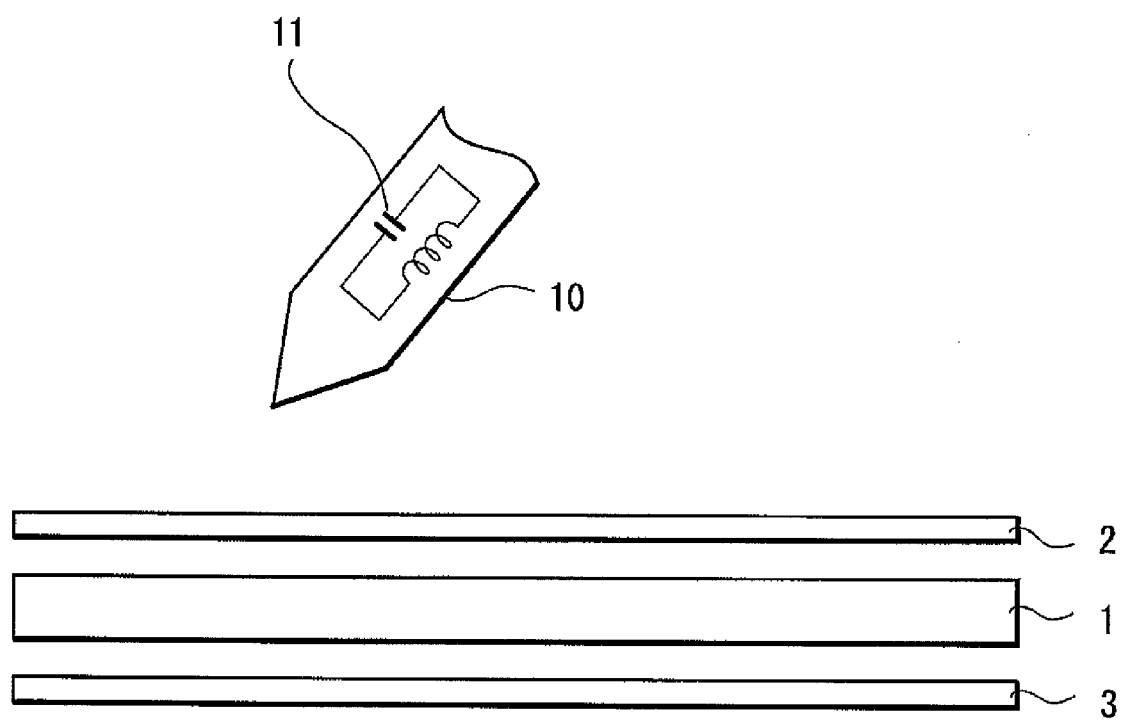
FIG. 1 is a schematic cross-sectional view showing a display/input device according to an embodiment of the present invention.

Reference will now be made in detail to the embodiments and methods of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in this section in connection with the preferred embodiments and methods. The invention according to its various aspects is particularly pointed out and distinctly claimed in the attached claims read in view of this specification.

FIG. 1 is a schematic cross-sectional view showing a display/input device according to an embodiment of the present invention.

As best shown in FIG. 1, detection coils 2 of an electromagnetic induction-type position detecting device may be formed as a detector on the display-surface side of a flat-panel display 1, such as a liquid crystal display. The detection coils 2 may be loop coils formed from thin copper wire having a thickness of 30 μm or less on a transparent substrate, as described in Japanese Patent No. 2139446. Alternatively, the detection coils 2 may be formed from ITO (indium tin oxide) or another transparent conductive material so as not to obstruct the display surface side (front view surface side) of the display 1. A driving coil 3 is provided on the rear-surface side of the display 1. The driving coil 3 may be made of any conductive material having a relatively low resistance.

In the display/input device best shown in FIG. 1, when performing position detection, signals of a predetermined frequency are applied to the driving coil 3. As a result, signals of the predetermined frequency are transmitted from the driving coil 3. The signals transmitted from the driving coil 3 cause a current to be induced in a resonance circuit 11 incorporated into a position indicator 10. In response, resonance signals are then transmitted from the position indicator 10 to the detection coils 2. Accordingly, the position detection is performed. That is, the position of the detection coil 2 having the greatest reception level or greatest signal level is determined to correspond to the position indicated by the position indicator 10.

Hence, in the display/input device best shown in FIG. 1, the driving coil 3 that supplies the electric current to the position indicator 10 is provided on the rear-surface side of the display 1 so that the driving coil 3 can be formed of any conductive material. Further, the driving coil 3 can be positioned anywhere on the rear-surface side of the display 1. By optimizing the material, e.g., by selecting a low resistance, and position of the driving coil 3 on the rear-surface side of the display 1, sufficient electric current can be supplied to the position indicator 10, and stable position detection can be performed constantly regardless of where along the display-side surface the position indicator 10 is located.

Figure 2:
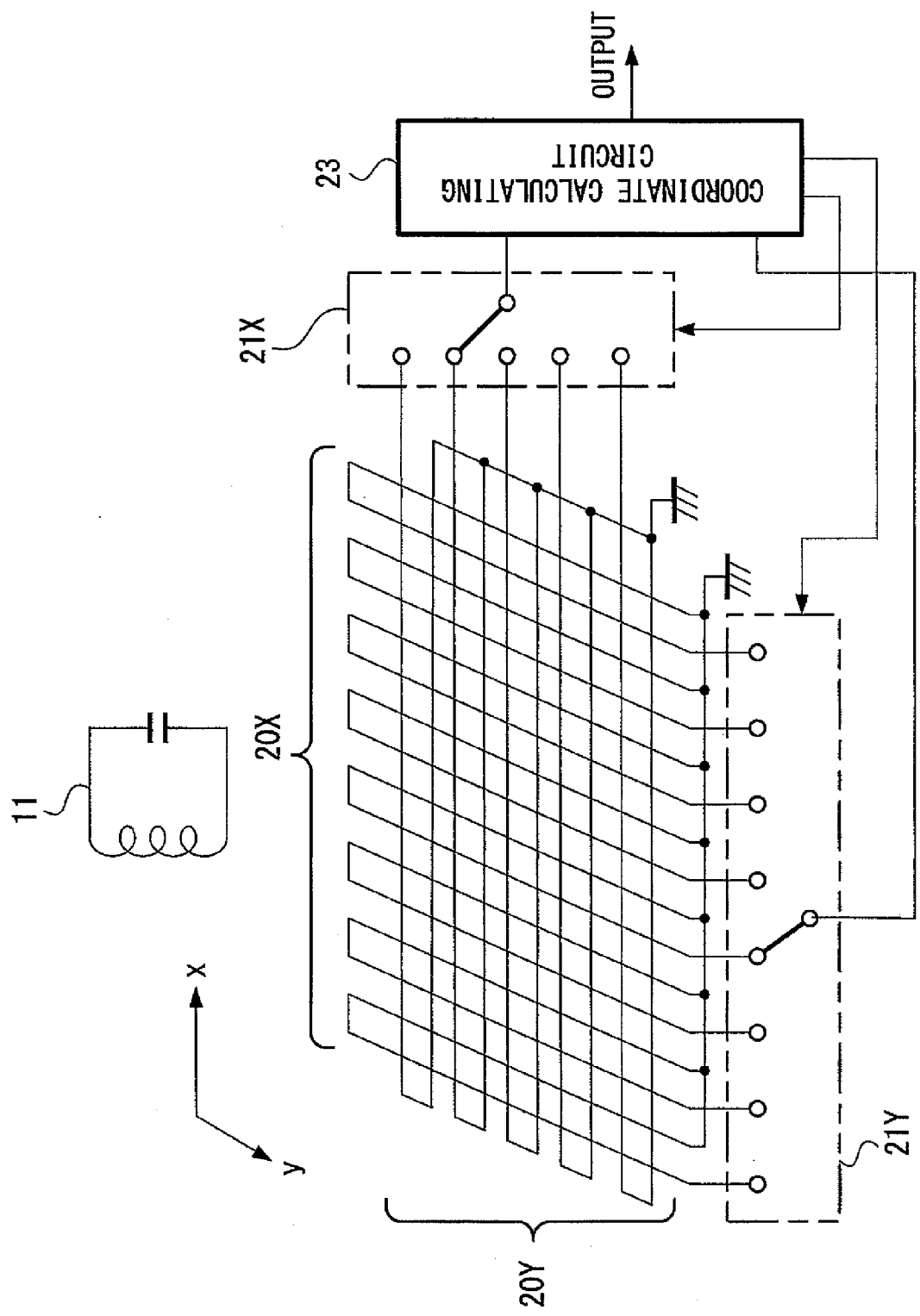
FIG. 2 is a schematic view showing a position detecting device according to another embodiment of the present invention.

As best shown in FIG. 2, the display/input device may include a plurality of the detection coils 2. The detection coils 2 are formed by a large number of loop coils 20X arranged in the X-axis direction and loop coils 20Y arranged in the Y-axis direction. When the resonance circuit 11 is moved into close proximity with the loop coils 20X, 20Y, resonance occurs. Based on the resonance signals transmitted from the resonance circuit 11 to the detection coils 20X and 20Y, the position of the position indicator 10 can be determined. Selection circuits 21X and 21Y sequentially selects loop coils 20X and 20Y, respectively, for sequentially outputting the signals received by each loop coil from the resonance circuit 11 to a coordinate calculating circuit 23. The intersection of the X loop coil 20X and Y loop coil 20Y determined to have received the signal with the greatest levels is determined by the coordinate calculating unit 23 to be the position of the position indicator 10.

Figure 3B:
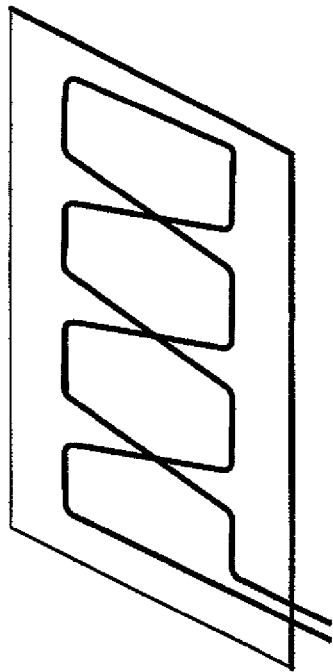
FIGS. 3A to 3D are schematic diagrams showing various shapes of a driving coil of a position detecting device according to various embodiments of the present invention.
Figure 3D:
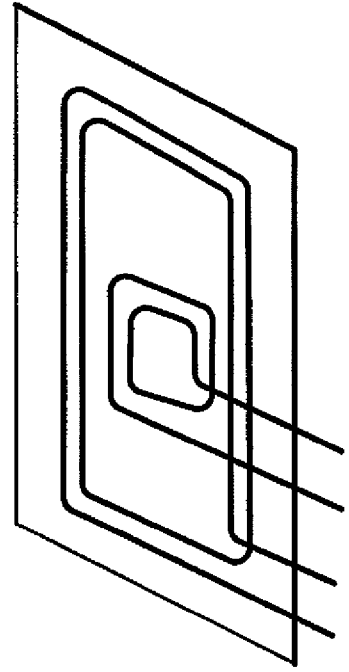
Figure 3A:
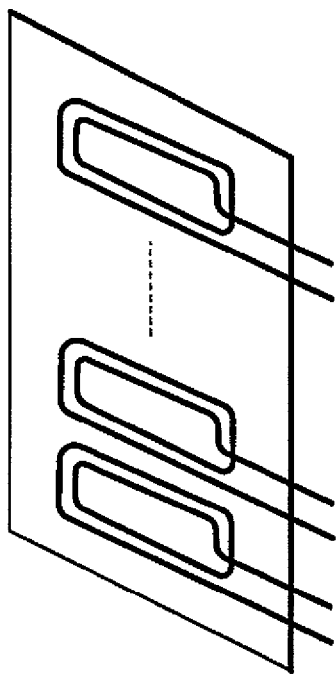

As best shown in FIGS. 3A to 3D, the driving coil 3 may have a variety of shapes. First, FIG. 3A shows an example in which a plurality of driving coils 3 are arrayed side-by-side across the entire rear-surface side of the display 1. In this case, the direction of arrangement of the driving coils 3 may be in either the X-axis direction or the Y-axis direction, or may be in an oblique (diagonal) direction. Alternatively, a driving coil 3 with a spiral shape may be disposed on the rear-surface side of the display 1, as best shown in FIG. 3B. The driving coil 3 shown in FIG. 3B may be wound back and forth across the rear-side surface in a zigzag, crossing pattern.

Figure 3C:
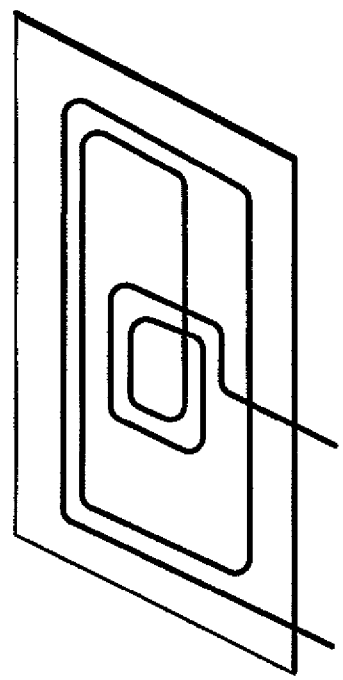

Alternatively, as best shown in FIGS. 3C and 3D, the driving coils 3 may be formed at a center portion of the display 1 and at a peripheral portion of the display 1. In this case, the driving coil 3 shown in FIG. 3C is formed of a single coil. Further, FIG. 3D shows an example in which separate driving coils 3 are provided at the peripheral portion and in the center portion of the display 1. In this case (FIG. 3D), the peripheral-portion coil may be placed on the display-surface side of the display 1, while the center-portion coil is placed on the rear-surface side of the display 1. The driving coil 3 spans a majority of the area of the rear-surface side of the display 1.

Figure 4:
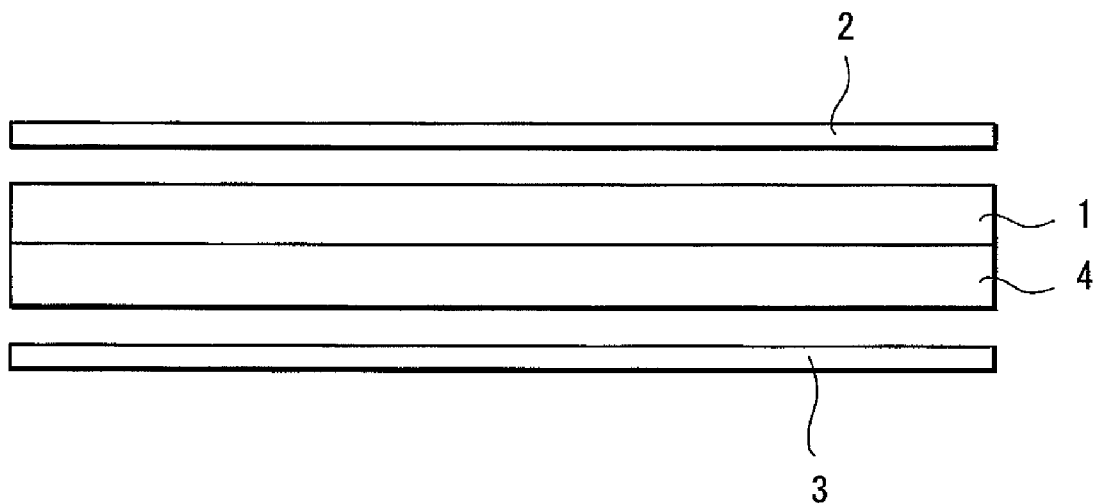
FIG. 4 is a schematic cross-sectional view showing a display/input device according to another embodiment of the present invention.

FIG. 4 is a schematic cross-sectional view showing a display/input device according to another embodiment of the present invention. In this embodiment, a backlight module 4 is provided on the rear-surface side of the display 1. Therefore, the driving coil 3 is provided on the rear-surface side of the backlight module 4. Because the driving coil 3 is provided on the rear-surface side of the backlight module 4, the driving coil 3 can be provided at any position on the backlight module 4 without interfering with the display 1. Hence, various shapes, such as those shown in FIGS. 3A to 3D, can be used for the driving coil 3, and stable position detection can be performed constantly by optimizing the material and position of the driving coil 3 so as to supply sufficient electric current to the position indicator 10.

Figure 5:
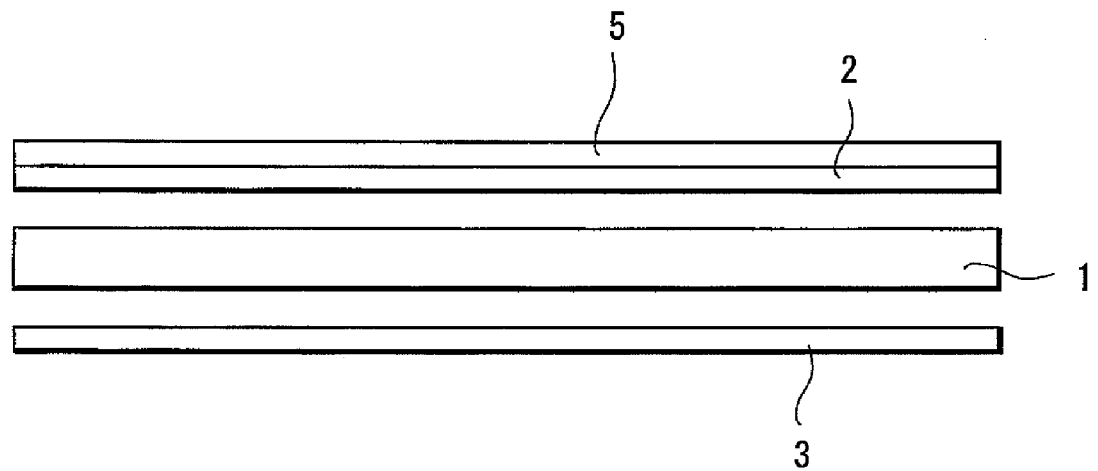
FIG. 5 is a schematic cross-sectional view showing a display/input device according to yet another embodiment of the present invention.

FIG. 5 is a schematic cross-sectional view showing a display/input device according to yet another embodiment of the present invention. In this embodiment, a pressure-sensing or other type of auxiliary position detection device 5 is provided and superimposed on the detection coils 2. The auxiliary position detection device 5 may be a touch sensor using, for example, a resistive film or capacitive touch sensor.

Accordingly, the driving coil 3 is provided on the rear-surface side of the display 1. As a result, the driving coil 3 can be provided at any position on the rear-surface side of the display 1 without interfering with the display 1. Hence, various shapes, such as those shown in FIGS. 3A to 3D, can be used for the driving coil 3, and the material and position of the driving coil 3 can be selected so as to ensure sufficient electric current is supplied to the position indicator 10, enabling stable position detection to be performed constantly.

During operation of the position detecting devices shown in FIGS. 1 to 5, a method in which transmission and reception are alternated repeatedly may be used. In this case, signals (position indicator driving signals) of a predetermined frequency are applied to the driving coil(s) 3 to cause the resonance circuit 11 of the position indicator 10 to resonate due to induced current. Then, the signals applied to the driving coil(s) 3 are terminated, and while switching between the detection coils 2 arrayed in the X axis and Y axis directions, the signal (position indicating signal) transmitted from the resonance circuit 11 of the position indicator 10 are detected at the detection coils 2 so that signal levels can be obtained and compared.

Alternatively, a method in which transmission and reception are simultaneously performed may be used. In this case, while applying the signals (the position indicator driving signals) of the predetermined frequency to the driving coil(s) 3, the detection coils 2 are switched in sequence. Then, when the resonance circuit 11 of the position indicator 10 approaches the detection coils 2, the driving coil(s) 3, the resonance circuit 11, and the detection coils 2 are electromagnetically coupled. As a result, an induced signal occurs and is detected by the detection coils 2.

In another embodiment of the present invention, there is provided a method in which the signals (the position indicator driving signals) of the predetermined frequency are applied from the driving coil(s) 3, and the signals received by the resonance circuit 11 of the position indicator 10 are stored as energy in a large-capacitance capacitor (not shown) within the position indicator 10. Subsequently, this power supply is used to transmit signals (the position indicating signals) from the position indicator 10 to be detected by the detection coils 2.

Although embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A position detecting device usable with a display having a front side and a rear side opposite to the front side, said position detecting device comprising:
   a position indicator for transmitting position-indicating signals;
   a position detector for disposing on the front side of the display, said position detector comprising a plurality of first conductive elements that comprise a transparent conductive member for extending across the display to detect said position-indicating signals transmitted from said position indicator, the first conductive elements having a first resistance; and
   a driving coil for disposing below the rear side of the display and comprising a second conductive element having a second resistance which is lower than said first resistance of said first conductive element so as to transmit a position-indicator driving signal to said position indicator and thereby induce a current in said position indicator; and
   wherein said position indicator comprises a resonant circuit for electromagnetic interaction with said driving coil to induce the current in said position indicator; and
   wherein said position detector comprises a plurality of detection coils forming a grid for extending across the display, and wherein said driving coil is operable to transmit a first signal to said position indicator to induce a current in said resonant circuit thereof, and said resonant circuit is operable to transmit a second signal to said detection coils for position detection; and
   wherein said driving coil is driven constantly so that said first signal and said second signal are transmitted simultaneously.

2. The position detecting device according to claim 1, wherein said position detector comprises an electromagnetic induction-type detection coil.

3. The position detecting device according to claim 1, wherein a current position of said position indicator is detected by comparing received signal strengths of said detection coils.

4. The position detecting device according to claim 1, wherein said driving coil comprises a plurality of driving coils arrayed across the rear side of the display.

5. The position detecting device according to claim 1, wherein said driving coil is wound around the rear side of the display repeatedly, said driving coil having a first portion wound around a center of the display and a second portion wound around a periphery of the display.

6. The position detecting device according to claim 1, wherein said driving coil comprises a first coil wound around a center of the display and a second coil, different from said first coil, wound around a periphery of the display.

7. The position detecting device according to claim 1, further comprising:
   a second driving coil for disposing wound around a periphery of the front side of the display, said driving coil and said second driving coil being driven simultaneously to transmit signals to said position indicator.

8. A position detecting device usable with a display having a front side and a rear side opposite to the front side, said position detecting device comprising:
   a position indicator for transmitting position-indicating signals;
   a position detector for disposing on the front side of the display, said position detector comprising a plurality of first conductive elements that comprise a transparent conductive member for extending across the display to detect said position-indicating signals transmitted from said position indicator, the first conductive elements having a first resistance; and a driving coil for disposing below the rear side of the display and comprising a second conductive element having a second resistance which is lower than said first resistance of said first conductive element so as to transmit a position-indicator driving signal to said position indicator and thereby induce a current in said position indicator and;

wherein said driving coil comprises a single driving coil wound spirally along the rear side of the display, said driving coil crossing back and forth along the rear side of the display several times.

9. A display device, comprising:

a display panel having a front display-surface side and a rear-surface side opposite the front display-surface side;

a position detecting device operably associated with said display panel, said position detecting device including a position indicator for transmitting position-indicating signals; a position detector provided on said front display-surface side of said display panel, said position detector comprising a plurality of first conductive elements that comprise a transparent conductive member extending across the display to detect said position-indicating signals transmitted from said position indicator, the first conducive elements having a first resistance; and a driving coil provided below said rear-surface side of said display panel and comprising a second conductive element having a second resistance which is lower than said first resistance of said first conductive element so as to transmit a position-indicator driving signal to said position indicator and thereby induce a current in said position indicator; and wherein said driving coil comprises a single driving coil wound spirally along said rear surface side of said display panel, said driving coil crossing back and forth along said rear surface side several times.

10. The display device according to claim 9, wherein:

said position detector comprises a plurality of detection coils forming a grid across said front display surface side of said display panel; and said position indicator comprises a resonant circuit for electromagnetic interaction with said driving coil and said detection coils; and said driving coil transmits a first signal to said position indicator to induce a current in said resonant circuit, and said resonant circuit transmits a second signal to said detection coils for position detection.

11. The display device according to claim 9, wherein said driving coil is wound around said rear surface side of said display panel repeatedly, said driving coil having a first portion wound around a center of said display panel and a second portion wound around a periphery of said display panel.

12. The display device according to claim 9, wherein said driving coil is provided below a center portion and a peripheral portion of said display.

* * * * *